United States Patent [19]

Lütjens et al.

[11] Patent Number: 5,180,781
[45] Date of Patent: Jan. 19, 1993

[54] PROCESS FOR THE PRODUCTION OF ALLOYS OF RUBBERS AND AROMATIC POLYESTERS

[75] Inventors: Holger Lütjens, Cologne; Uwe Westeppe, Mettmann; Karl-Erwin Piejko, Bergisch-Gladbach; Christian Lindner, Cologne, all of Fed. Rep. of Germany

[73] Assignee: Bayer Aktiengesellschaft, Leverkusen, Fed. Rep. of Germany

[21] Appl. No.: 708,304

[22] Filed: May 31, 1991

[30] Foreign Application Priority Data

Jun. 12, 1990 [DE] Fed. Rep. of Germany ....... 4018717

[51] Int. Cl.$^5$ ...................... C08L 69/00; C08L 67/03; C08L 33/08; C08J 3/00
[52] U.S. Cl. ...................... 525/148; 525/64; 525/67; 525/132; 525/146; 525/474; 525/539
[58] Field of Search ................... 525/64, 67, 132, 146, 525/148, 474, 539

[56] References Cited

U.S. PATENT DOCUMENTS

| | | | |
|---|---|---|---|
| 4,299,928 | 11/1981 | Witman | 525/67 |
| 4,677,183 | 6/1987 | Mark | 525/146 |
| 4,764,556 | 8/1988 | Lausberg | 525/146 |
| 4,831,082 | 5/1989 | Peascoe | 525/903 |

*Primary Examiner*—David J. Buttner
*Attorney, Agent, or Firm*—Connolly & Hutz

[57] ABSTRACT

The process for the production of an alloy of cross-linked or partially cross-linked rubbers and aromatic polyesters basically consists of reacting a mixture of a rubber latex and an aqueous solution of an alkali metal or alkaline earth metal diphenolate with a solution of a dicarboxylic acid halide and/or a carbonyl halide in a water-immiscible solvent. An aromatic polyester forms at the water/organic solvent phase boundary and goes over into the organic phase. At the same time, the rubber migrates from the aqueous into the organic phase. When the organic phase is separated and the organic solvent removed, the alloy of rubber and oirganic polyester remaining behind is suitable for the production of moulded articles of all kinds.

5 Claims, No Drawings

PROCESS FOR THE PRODUCTION OF ALLOYS OF RUBBERS AND AROMATIC POLYESTERS

This invention relates to a process for the production of an alloy of cross-linked or partially cross-linked rubbers and aromatic polyesters. The process basically consists in reacting a mixture of a rubber latex and an aqueous solution of an alkali metal or alkaline earth metal diphenolate with a solution of a dicarboxylic acid halide and/or a carbonyl halide in a water-immiscible solvent. An aromatic polyester forms at the water/organic solvent phase boundary and goes over into the organic phase. At the same time, the rubber goes over from the aqueous phase into the organic phase. When the organic phase is separated and the organic solvent removed, an alloy of rubber and aromatic polyester remains behind. This alloy is suitable for the production of molded articles of all kinds by the methods of thermoplastic molding such as extrusion or injection molding. The alloys have improved elasticity and elongation at break, good surface properties such as gloss, freedom from spots, uniformity and an exceptionally light color.

The rubbers suitable for the process according to the invention are in the form of their latices. They are generally cross-linked or partially cross-linked and have softening temperatures below 0° C. These rubbers and their latices are known. Diene rubbers are particularly suitable, especially polymers of butadiene, isoprene and chloroprene optionally with up to 30% by weight of a comonomer such as styrene, acrylonitrile, alkyl acrylate or a vinyl ether, and acrylate rubbers, in particular polymers of alkyl acrylates with optionally up to 50% by weight of comonomers such as butadiene, alkyl methacrylate, vinyl acetate, styrene, vinyl, alkyl ether, or acrylonitrile, and olefin rubbers, in particular of ethylene with comonomers such as vinyl acetate, alkyl acrylate, carbon monoxide, propylene or isobutylene, and silicone rubbers, in particular composed of structural units corresponding to the general formula

$R_n SiO_{4-n/2}$ wherein R is a monovalent hydrocarbon group, e.g. $C_1$–$C_{18}$-alkyl or $C_6$–$C_{10}$-aryl and n has an average value of from 1 to less than 3.

The rubbers are present as latices, as already mentioned. The average particle diameters ($d_{50}$) in the latices are from 0.05 to 1.5 μm, in particular from 0.07 to 0.5 μm, and the gel contents, which are a measure of cross-linking, are >20%, preferably >50%, most preferably >80%.

Acrylate rubbers are particularly preferred and have preferably been obtained by radical emulsion polymerization. They are cross-linked, particulate emulsion polymers of $C_1$–$C_8$-alkyl acrylates, in particular $C_2$–$C_8$-alkyl acrylates, optionally in admixture with up to 15% by weight of a comonomer such as styrene, methyl methacrylate, butadiene, vinyl methyl ether or acrylonitrile and at least one polyfunctional cross-linking co-monomer such as divinylbenzene, glycol bis-acrylate, butanediol bis-acrylate, bis-acrylamide, phosphoric acid tri-allylester, allylesters of acrylic acid, allylesters of methacrylic acid, triallylcyanurate and triallylisocyanurate in quantities of up to 4% by weight, based on the total quantity of monomers.

Rubbers having a core/sheath structure as described, for example, in DE-OS 32 00 070 and DE-OS 37 04 657 may also be used.

The aromatic polyesters (the term is used in the present invention to include aromatic polyesters, aromatic polycarbonates and aromatic polyester carbonates) produced for the purpose of the present invention are based on bisphenols corresponding to formula (I)

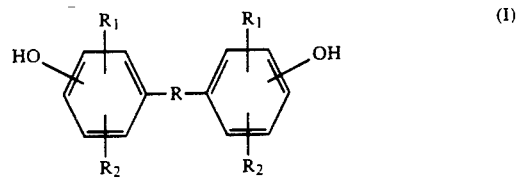

wherein $R_1$, $R_2$=H, $C_1$–$C_4$-alkyl, or halogen, preferably H, $CH_3$, Cl or Br, R = a single bond, $C_1$–$C_{12}$-alkylene, $C_5$–$C_{20}$-cycloalkylene or arylene, preferably $CH_2$, $C_2H_4$, $C_3H_6$, S,

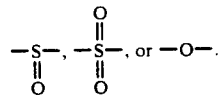

The following are examples of suitable diphenols corresponding to formula (I): Hydroquinone, resorcinol, 4,4-dihydroxyphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)propane, 2,2-bis-(3,5-dibromo-4-hydroxyphenyl)-propane, 1,1-(bis-4-hydroxyphenyl)-3,3,5-trimethylcyclohexane. The following are preferred diphenols corresponding to formula (I): 2,2-Bis-(4-hydroxyphenyl)-propane, 2,2-bis-(3,5-dichloro-4-hydroxyphenyl)-propane, 1,1-bis-(4-hydroxyphenyl)-cyclohexane and 1,1-(bis-4-hydroxyphenyl)-3,3,5 -trimethylcyclohexane. 2,2-Bis-(4-hydroxyphenyl)-propane is particularly preferred.

For producing aromatic polycarbonates, these diphenols are reacted with carbonyl halides such as carbonyl bromide, phosgene or mixtures thereof or with bischloroformates of 2,2-bis-(4-hydroxyphenyl)-propane, 2,2-bis-(4-hydroxy-3,5-dichlorophenyl)-propane or hydroquinone.

Aromatic polyesters are produced by a reaction with dicarboxylic acid halides such as, for example, oxalyl chloride, succinyl chloride, fumaryl chloride, glutaryl chloride, adipyl chloride, pimelyl chloride, suberyl chloride, azelayl chloride, sebacyl chloride, phthaloyl chloride, isophthaloyl chloride or terephthaloyl chloride. Terephthaloyl chloride, isophthaloyl chloride and mixtures thereof are preferred. The ratio of isophthaloyl groups to terephthaloyl groups is preferably from 3:7 to 7:3, in particular from 4.5:5.5 to 5.5:4.5.

Polyester carbonates are prepared from a mixture of carbonyl halide and dicarboxylic acid halide in such a quantity that up to 90 mol %, preferably up to 45 mol % of carbonate groups are formed, based on the sum of ester and carbonate groups.

The process according to the invention itself may be carried out according to the known rules of phase interface polycondensation as described, for example, in Chemistry and Physics of Polycarbonates, Polymer Reviews. Vol. IX, pages 33 et seq, Interscience Publishers (1964)).

According to the invention, alkali metal or alkaline earth metal salts of the diphenols of formula (I) are reacted as aqueous solutions with dicarboxylic acid halides and/or carbonyl halides in water-immiscible inert organic solvents in the presence of aqueous rubber latices to form the polyester-rubber alloys according to the invention. The process according to the invention may, for example, be carried out as follows: The aqueous latex of a cross-linked or partially cross-linked rubber, preferably an acrylate rubber, is mixed with an aqueous solution of a salt of the diphenol of formula (I) at 0° to 50° C., preferably at 10° to 25° C. The rubber latices preferably have a solids content of from 10 to 50% by weight, in particular from 15 to 40% by weight. The aqueous diphenolate solutions may be prepared by dissolving the diphenol of formula (I) in an aqueous alkali metal hydroxide solution, preferably in a sodium hydroxide solution. A particularly preferred diphenol of formula (I) is 2,2-bis-(4-hydroxyphenyl)-propane. A water-immiscible inert organic solvent, preferably methylene chloride and/or chlorobenzene optionally containing phase transfer catalysts such as quaternary ammonium compounds in solution, is then added in about 20 to 80 times the weight of rubber in the latex, and the components are mixed together.

The dicarboxylic acid halide or carbonyl halide, or both at the same time, are then added to this vigorously stirred mixture at 0° to 50° C., preferably at 10° to 25° C., within a period of from 5 minutes to 5 hours, preferably 5 minutes to 2 hours. Terephthalic acid dichloride, isophthalic acid dichloride and mixtures thereof are preferred dicarboxylic acid halides and phosgene is a preferred carbonyl halide.

Alternatively, the aqueous rubber latex may first be mixed with the inert organic solvent optionally containing phase transfer catalyst at 0° to 50° C., preferably at 10° to 25° C., and the aqueous solution of a salt of the diphenol of formula (I) and the dicarboxylic acid halides and/or carbonyl halides may then be added to the reaction mixture within a period of from 5 minutes to 5 hours, preferably 5 minutes to 2 hours, at 0° to 50° C., preferably at 10° to 25° C., optionally with stirring of the reaction mixture, either in the sequence given here or simultaneously.

When both dicarboxylic acid halides and carbonyl halides are used, it is advantageous first to add the dicarboxylic acid halide and then the carbonyl halide. Catalysts, for example tertiary amines such as triethylamine or N-ethylpiperidine, may be added after addition of the carbonyl halide.

The molecular weight of the aromatic polyester, in the sense of the definition given above, may be regulated in known manner by the addition of a chain terminator. Suitable chain terminators are, for example: Phenol and phenols containing $C_1$-$C_{22}$-alkyl groups, such as p-tert.butylphenol and p-isooctylphenol.

Tertiary amines, alkali metal hydroxides and alkaline earth metal hydroxides, preferably sodium hydroxide, may be used as acid acceptors.

The ratio by weight of polyester:rubber in the polymer alloys produced according to the invention is from 95:5 to 5:95, preferably from 95:5 to 20:80, most preferably from 95:5 to 30:70. To isolate the polymer alloys according to the invention, the organic phase may first be separated from the aqueous phase, then washed neutral with organic acids or mineral acids, e.g. phosphoric acid and finally washed free from electrolytes with water. In some cases it is advantageous to neutralize the whole reaction mixture with organic acids or mineral acids and only thereafter to separate the organic phase and wash with water. The polymer alloy may be isolated from the organic phase by, for example, removal of the organic solvent by distillation, by evaporation in suitable apparatus or by coagulation.

The separated organic phase may, for example, be coagulated by introducing it into organic liquids which have a low solubility for the aromatic polyester and mixing the components, or the said organic liquids may be added to the organic phase. The organic liquids used for this purpose are preferably aliphatic hydrocarbons and mixtures thereof, such as hexane, heptane or aliphatic alcohols such as methanol, ethanol or isopropanol.

After coagulation, the polymer alloy may be separated, for example by filtration or centrifuging, and optionally washed, e.g. with water.

The polymer alloys according to the invention are suitable for the production of molded articles of all kinds such as films, fibers and parts of apparatus. They have improved elasticity and elongation at break, and good surface characteristics such as gloss, freedom from spots, uniformity and a good raw tone.

EXAMPLES

Example 1

Preparation of the rubber latex 1,030 Parts by weight of water and 5 parts by weight of the sodium salt of $C_{14}$-$C_{18}$-alkylsulphonic acids are introduced into a reactor under nitrogen and heated to 70° C. A mixture of 80 parts by weight of n-butyl acrylate and 0.4 parts by weight of 1,4-butanediol diacrylate is then added and a solution of 3 parts by weight of potassium peroxydisulphate and 60 parts by weight of water is subsequently added at 70° C. The following are then added at a uniform rate over a period of 5 hours:

| Inflow 1: |
|---|
| 920 parts by weight of n-butylacrylate |
| 4.6 parts by weight of 1,4-butanediol diacrylate |
| Inflow 2: |
| 20 parts by weight of the sodium salt of $C_{14}$-$C_{18}$-alkylsulphonic acids |
| 700 parts by weight of water. |

The reaction mixture is then stirred for 4 hours at 70° C. The latex obtained has a solids content of 36.5% by weight. The gel content of the polymer is 90.0% by weight (determined in tetrahydrofuran). This latex is diluted to a solids content of 20% by weight with water and used in Examples 2.1 to 2.6.

EXAMPLE 2

Preparation of the polyester/rubber alloys 1. 450 g of methylene chloride containing 0.645 g of tetrabutylammonium bromide in solution are added to 45 g of the latex from Example 1 and the components are mixed together. The following are added at a uniform rate over 15 minutes with constant mixing:

| Inflow 1: A solution of: |
|---|
| 22.83 g (0.10 mol) of 2,2-bis-(4-hydroxy- | phenyl)-propane (hereinafter referred
to as bisphenol A) with
10.0 g (0.25 mol) of sodium hydroxide in
560 g of water
Inflow 2: A solution of:
10.36 g (0.051 mol) of terephthaloyl chloride
and
10.36 g (0.051 mol) of isophthaloyl chloride in
50 g of methylene chloride.

Stirring is then continued for one hour and the aqueous phase is separated to work up the product.

The organic phase is washed neutral with dilute phosphoric acid and then washed free from electrolytes with water.

The polymer alloy is precipitated by mixing the organic phase with petroleum ether, separated from the organic liquid by filtration, washed with water and dried.

Quantity of polymer: 43.0 g
Gel content (determined in tetrahydrofuran): 17.7% by wt.
[η] of the sol phase: 0.65
[η] Intrinsic viscosity determined in tetrahydrofuran at 25° C.

2. The same procedure as in Example 2.1 is carried out, but using
120 g of the latex from Example 1 and
1,450 g of methylene chloride with 0.645 g of dissolved tetrabutylammonium bromide.
Inflow 1: as in Example 2.1
Inflow 2: as in Example 2.1

| | |
|---|---|
| Quantity of polymer: | 58 g |
| Gel content (determined in tetrahydrofuran): | 36.2% by wt. |
| [η] of the sol phase: | 0.52. |

3. The procedure is the same as in Example 2.1, but using
90 g of the latex from Example 1 and
1,200 g of methylene chloride with 0.645 g of dissolved tetrabutyl ammonium bromide

| | |
|---|---|
| Inflow 1: Solution of: | |
| 11.42 g (0.050 mol) of bisphenol A and | |
| 5.0 g (0.125 mol) of sodium hydroxide in | |
| 280 g of water | |
| Inflow 2: Solution of: | |
| 5.18 g (0.0255 mol) of terephthaloyl chloride and | |
| 5.18 g (0.0255 mol) of isophthaloyl chloride in | |
| 35 g of methylene chloride | |
| Quantity of polymer: | 35.2 g |
| Gel content (determined in tetrahydrofuran): | 43.8% by wt. |
| [η] of the sol phase: | 0.36 |

4. The procedure is the same as in Example 2.1 but using
45 g of the latex from Example 1 and
450 g of methylene chloride with 0.645 g of dissolved tetrabutylammonium bromide

| | |
|---|---|
| Inflow 1: Solution of: | |
| 0.90 g of p-tert.-butylphenol (6 mol %, based on bisphenol A), | |
| 22.83 g (0.10 mol) of bisphenol A and | |
| 10.0 g (0.25 mol) of sodium hydroxide in | |
| 560 g of water | |
| Inflow 2: As in Example 2.1 | |

| | |
|---|---|
| Quantity of polymer: | 43.7 g |
| Gel content (determined in tetrahydrofuran): | 17.6% by wt. |
| [η] of the sol phase: | 0.32 |

5. 450 g of methylene chloride containing 0.645 g of tetrabutylammonium bromide in solution are added to 45 g of the latex from Example 1 with mixing and a solution of

| | |
|---|---|
| 22.83 g (0.10 mol) of bisphenol A and | |
| 10.0 g (0.25 mol) of sodium hydroxide in | |
| 560 g of water | | is then introduced into the reaction mixture within 20 minutes and the components are mixed together.
A solution of

| | |
|---|---|
| 0.45 g of p-tert.-butylphenol (3 mol %, based on bisphenol A) | |
| 10.36 g (0.051 mol) of terephthaloyl chloride and | |
| 10.36 g (0.051 mol) of isophthaloyl chloride in | |
| 50 g of methylene chloride | | is then added within 15 minutes.

Stirring is continued for 1 hour after all the components have been added and the product is then worked up as in Example 2.1.

| | |
|---|---|
| Quantity of polymer: | 44.1 g |
| Gel content (determined in tetrahydrofuran): | 18.2% by wt. |
| [η] sol phase: | 0.48. |

6. 29 g of the latex from Example 1 are mixed with a solution of

| | |
|---|---|
| 22.83 g (0.10 mol) of bisphenol A and | |
| 24.0 g (0.60 mol) of sodium hydroxide in | |
| 250 g of water. | |

250 g of methylene chloride containing 0.965 g of tetrabutylammonium bromide in solution are then added with mixing and 19.8 g (0.20 mol) of phosgene are introduced and the reaction mixture is stirred for 45 minutes. The product is worked up as in Example 2.1.

| | |
|---|---|
| Quantity of polymer: | 30.4 g |
| Gel content (determined in tetrahydrofuran): | 16.7% by wt. |
| [η] sol phase: | 0.37. |

The polymer alloys of Examples 2.1 to 2.6 are free-flowing, pulverulent products with no tendency to clump together or stick. The polymer alloys of Examples 2.1, 2.4, 2.5 and 2.6 may be used for the production of solid cast films.

Example 3

1. 3 g of the polymer alloy from Example 2.1 are added to 17 g of tetrahydrofuran (THF) and the mixture is stirred for 2 hours at room temperature (700 revs/min). Films are cast (500 μm, wet) from the dispersion thus obtained (15% by weight) and the films are dried to constant weight at 50° C. The films are distinguished by their homogeneity and freedom from spots.

2. (Comparison to 3.1): 2.4 g of an aromatic polyester (from bisphenol A) and terephthaloyl chloride/isophthaloyl chloride (1:1) having an intrinsic viscosity [$\eta$] of 0.41 determined in tetrahydrofuran at 25° C. are dissolved in 17 g of tetrahydrofuran at room temperature. 0.6 g of fine rubber (obtained from the latex of Example 1 by coagulation with magnesium sulphate/glacial acetic acid solution at 80° to 90° C., washing and drying) are added and the mixture is stirred for 2 hours (700 revs/min). The rubber is not distributed by this process but stays in the form of large agglomerates (lumps) in the solution of the polyester. A homogeneous film could not be produced.

Example 4 (Comparison Example to 2.6)

An attempt was made to incorporate 20 parts by weight of the rubber powder (obtained from the latex of Example 1 by coagulation with the magnesium sulphate/glacial acetic acid solution at 80° to 90° C., washing and drying) in 80 parts by weight of a polycarbonate (Makrolon 2802) in a double shaft extruder. It was found that the rubber powder could not be incorporated since uniform dosing was not possible.

We claim:

1. A process for the production of an alloy of cross-linked or partially cross-linked rubbers and aromatic polyesters, wherein a mixture of a rubber latex and an aqueous solution of an alkali metal diphenolate or an alkaline earth metal diphenolate is reacted with a solution of a dicarboxylic acid halide and/or a carbonyl halide in a water-immiscible solvent, an aromatic polyester forming at the phase boundary of water/organic solvent, which polyester goes over into the organic phase, and the rubber at the same time going from the aqueous phase into the organic phase, and the organic phase is then separated and the organic solvent is removed.

2. Process according to claim 1, wherein the rubber latex contains rubber particles having an average diameter of 0.05 to 1.5 μm and having a gel content of more than 20% by weight.

3. Process according to claim 1, wherein the rubber is an acrylate rubber.

4. Process according to claim 1, wherein the rubber is cross-linked poly(n-butyl) acrylate.

5. Process according to claim 1, wherein the aromatic polyester is based on bisphenol A.

* * * * *